United States Patent
Lin

(10) Patent No.: US 9,628,745 B2
(45) Date of Patent: Apr. 18, 2017

(54) SCREEN SPLITTING SYSTEM AND METHOD

(71) Applicant: HON HAI PRECISION INDUSTRY CO., LTD., New Taipei (TW)

(72) Inventor: Po-Yu Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/059,548

(22) Filed: Mar. 3, 2016

(65) Prior Publication Data

US 2017/0034469 A1 Feb. 2, 2017

(30) Foreign Application Priority Data

Jul. 29, 2015 (TW) .............................. 104124607 A

(51) Int. Cl.
*H04N 5/45* (2011.01)
*H04N 5/445* (2011.01)
*H04N 9/74* (2006.01)

(52) U.S. Cl.
CPC ..... H04N 5/44591 (2013.01); H04N 5/44582 (2013.01); H04N 5/45 (2013.01)

(58) Field of Classification Search
CPC .... H04N 5/45; H04N 5/2624; H04N 5/44591; H04N 2005/44595; H04N 5/44504; H04N 5/44582

USPC .......... 348/564, 567, 569, 588, 565; 725/43; 345/169, 620, 629, 635, 638
IPC .............................. H01N 5/445,5/45, 5/50, 9/74
See application file for complete search history.

(56) References Cited

U.S. PATENT DOCUMENTS

| 9,319,749 B2 * | 4/2016 | Lee ..................... H04N 21/4858 |
| 2015/0301777 A1 * | 10/2015 | Jang .......................... G06F 3/14 |
| | | 345/169 |
| 2016/0241905 A1 * | 8/2016 | Gao ....................... G06F 3/1431 |

FOREIGN PATENT DOCUMENTS

| CN | 100405832 C | 7/2008 |
| CN | 101895702 A | 11/2010 |
| CN | 102006433 A | 4/2011 |

* cited by examiner

*Primary Examiner* — Sherrie Hsia
(74) *Attorney, Agent, or Firm* — Steven M. Reiss

(57) ABSTRACT

In a TV screen splitting system and method, a single screen is split into multiple sub-screens according to a defined number. The sub-screens are each associated with at least one remote control device, and wherein one sub-screen relates to one application. Applications relating to the sub-screens are enabled and displayed on the sub-screens. An instruction corresponding to a selected application can be given by the remote control device. The selected application displayed on a sub-screen can be controlled via the remote control device according to the received instruction.

12 Claims, 7 Drawing Sheets d1 c1 d2 c2 d3 c3 d4 c4

FIG. 4

SCREEN SPLITTING SYSTEM AND METHOD

CROSS-REFERENCE TO RELATED APPLICATIONS

This application claims priority to Taiwanese Patent Application No. 104124607 filed on Jul. 29, 2015, the contents of which are incorporated by reference herein.

FIELD

The subject matter herein generally relates to viewability of smart televisions (TVs).

BACKGROUND

With over-the-top (OTT) boxes and smart TVs, people can either watch TV programs and movies or use applications and play games via connecting to the Internet. Currently, a television is manufactured that its screen is commonly about 40 inches to 60 inches and is provided with super high resolution and high performance computing processors, quad-core processors, or even dual quad-core processors

BRIEF DESCRIPTION OF THE DRAWINGS

Implementations of the present technology will now be described, by way of example only, with reference to the attached figures, wherein:

FIG. 4 illustrates a diagrammatic view of another embodiment of layouts for the sub-screens in a screen splitting system;

DETAILED DESCRIPTION

Figure 1:
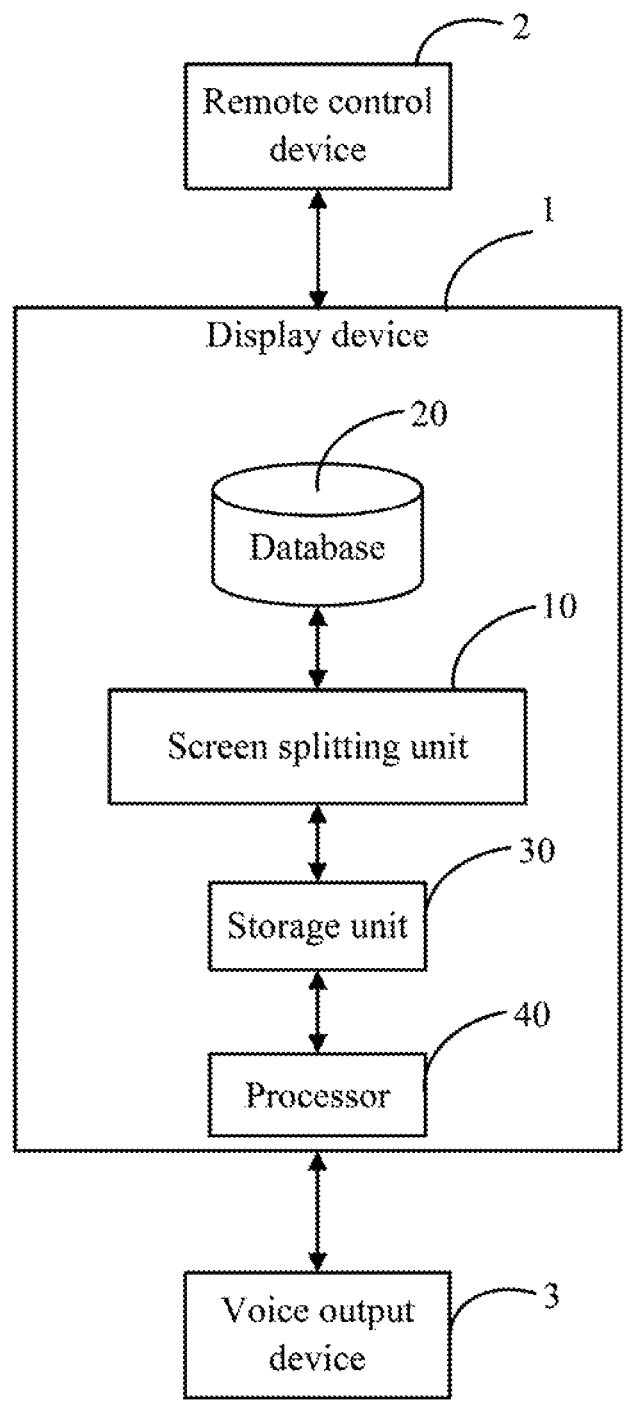
FIG. 1 illustrates a block diagram of an embodiment of a screen splitting system for a display device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

FIG. 1 illustrates an embodiment of a screen splitting system for a display device (screen splitting system). In the embodiment, the screen splitting system comprises a display device 1, at least one remote control device 2, and at least one voice output device 3. The display device 1 includes a screen splitting unit 10, a database 20, a storage unit 30, and a processor 40. The display device 1 can communicate with the remote control device 2 and the voice output device 3. In the embodiment, the voice output device 3 outputs audio and may be a speaker, an earphone, or a sound box. The database 20 stores associating information about serial numbers of multiple sub-screens and identification (ID) number codes of the remote control device 2 and associating information about the serial numbers of the sub-screens and serial numbers of the voice output device 3.

In the embodiment, the screen splitting unit 10 is mainly applied to a smart television. In other embodiments, the screen splitting unit 10 can also be applied in a set top box (STB).

Figure 2:
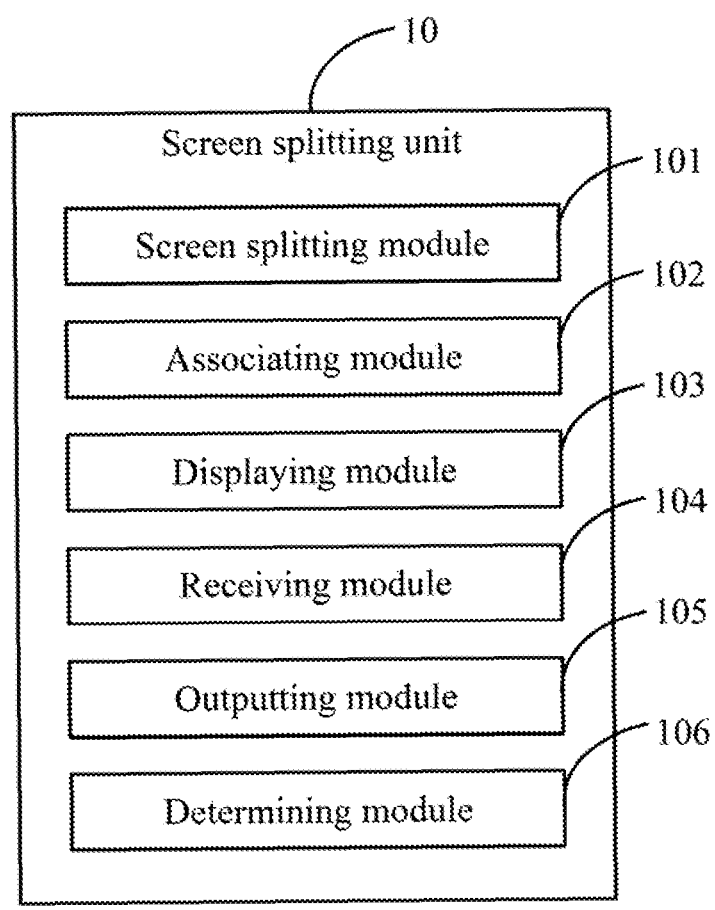
FIG. 2 illustrates a block diagram of an embodiment of a screen splitting unit in a display device.

FIG. 2 illustrates an embodiment of the screen splitting unit 10 in the display device 1. The screen splitting unit 10 includes a screen splitting module 101, an associating module 102, a displaying module 103, a receiving module 104, an outputting module 105, and a determining module 106. These one or more function modules can include computerized codes in the form of one or more programs that are stored in the storage unit 30, and executed by the processor 40 to provide functions of the splitting screen unit 10. Descriptions of the functions of the modules 101-106 are given with reference to FIG. 5.

The screen splitting module 101 splits a single screen of a television into a number of multiple sub-screens, the number being defined by user, for example, 2 or 4 or other number. Each of the sub-screens is provided with a serial number. For example, the sub-screens are serially assigned with numbers such as controller#1, controller#2, controller#3, and controller#4 when the screen of the television is split into four sub-screens. In an embodiment, each of the sub-screens is entirely configured to perform the same functions.

The associating module 102 associates each of the sub-screens with the remote control device 2. The associating module 102 receives a request command sent by the remote control device 2 for association with a selected sub-screen. The request command contains an ID number (ID) number of the remote control device 2. The associating module 102 determines whether the remote control device is associated with the selected sub-screen and cancels the association when the remote control device has been associated with the selected sub-screen. An ID number of the remote control device 2 is associated with a serial number of the selected sub-screen when an association is made.

In an embodiment, the user moves a focus window to select a sub-screen using orientation keys of the remote control device 2, and presses the [OK] key to trigger a confirmation. The confirmation action carries the request command sent by the remote control device 2 for association with the selected sub-screen. The request command contains the ID number of the remote control device 2. The ID number of the remote control device 2 is defined according to user requirements. In an embodiment, when multiple remote control devices 2 are provided, the remote control devices 2 are serially assigned with ID numbers 01-N. For example, when a request command sent by the remote control device 2 which has ID number 01 is to be associated with a sub-screen assigned with the serial number controller#2, the associating module 102 determines whether the remote control device 2 with ID number 01 is associated with the controller #2 sub-screen. The associating module 102 cancels the association with the controller#2 sub-screen when the remote control device 2 with ID number 01 has been associated with the controller#2 sub-screen. Otherwise, the associating module 102 associates the remote control device 2 with ID number 01 with the controller#2 sub-screen and stores their association as controller#2:01 in the database 20.

The associating module 102 stores association information in the database 20 and an association table (not shown) is therefore created. The associating module 102 determines whether each of the selected sub-screens is associated with the remote control device(s) 2 according to the association table. The associating module 102 displays association information when associations have been made and if a selected sub-screen is not associated with a remote control device(s) 2 one or more predetermined images are displayed on the selected sub-screen.

In an embodiment, a sub-screen may be associated with one or more remote control devices 2 or be not associated with any remote control device 2. Therefore, a controller#N sub-screen may be associated with several remote control devices 2. For example, the association information "controller#1:02" indicates that the controller#1 sub-screen is associated only with the remote control device 2 with ID number 02. The association information "controller#2:03 controller#2:04" indicates that the controller#2 sub-screen is associated with remote control device 2 having ID number 03 and with remote control device 2 having ID number 04. Each of the sub-screens displays corresponding association information. When a sub-screen is not associated with any remote control device 2, a desktop of the sub-screen displays a predetermined image or preset information, for example weather news or advertisements.

The displaying module 103 activates and displays applications relating to the sub-screens on respective desktops of the sub-screens. In an embodiment, the displaying module 103 displays icons of applications for user selection when the associating module 102 associates a selected sub-screen with a remote control device(s) 2. The user selects from the applications and the voice output device 3 based on their requirements.

The receiving module 104 receives instructions from the remote control devices 2. The receiving module 104 controls a selected application via the remote control device according to the received instruction. In an embodiment, the displaying module 103 displays the icons of applications on the sub-screen for user selection. The remote control device 2 sends a request instruction to the receiving module 104 when an application is selected via the remote control device 2. The receiving module 104 receives the request instruction and enables an application on the corresponding sub-screen.

The outputting module 105 transmits voice signals corresponding to multiple voice output devices 3. In an embodiment, each sub-screen corresponds to at least one voice output device 3. The outputting module 105 transmits voice signals generated by operating applications to corresponding voice output devices 3, such that the users operating different applications do not suffer interference with or from each other. In an embodiment, the voice output devices 3 can be a speaker, an earphone, a sound box or any other voice output device.

The determining module 106 makes a first layout of first sub-screens according to a first number of the first sub-screens associated with the remote control devices 2 and according to representative styles of the first applications related to the first sub-screens. The representative styles of the applications can comprise a horizontal style and a vertical style.

The determining module 106 also determines the quantity of sub-screens associated with the remote control device(s) 2. The determining module 106 determines whether the vertical style for at least one application is involved when the first number is between 1 and the defined number. The determining module 106 rearranges the first layout of the first sub-screens as a second layout if the vertical style for at least one application is involved, and splits the single screen into multiple areas corresponding to the quantity of sub-screens associated with the remote control devices 2. The single screen is split into equal left and right areas and the application with the vertical style can be located in either area. Further, the remaining area (without the application with the vertical style) can be split into equal top and bottom areas. The determining module 106 rearranges the first layout of the first sub-screens as a third layout when the vertical style for at least one application is not involved. The single screen is split into equal top and bottom areas, then either one of the top and bottom areas can be split into equal left and right areas when the vertical style for at least one application is not involved. All applications are rearranged on corresponding split areas; the screen size proportion of each application on the split areas is adjusted adaptively according to the size and resolution definition of the screen of each area while all applications are arranged to be located in corresponding areas.

The determining module 106 also displays a sub-screen occupying full screen of television when the first number is 1; a sole sub-screen as a primary layout is split into multiple sub-screens according to the defined number when the first number is equal to the defined number.

Figure 3A:
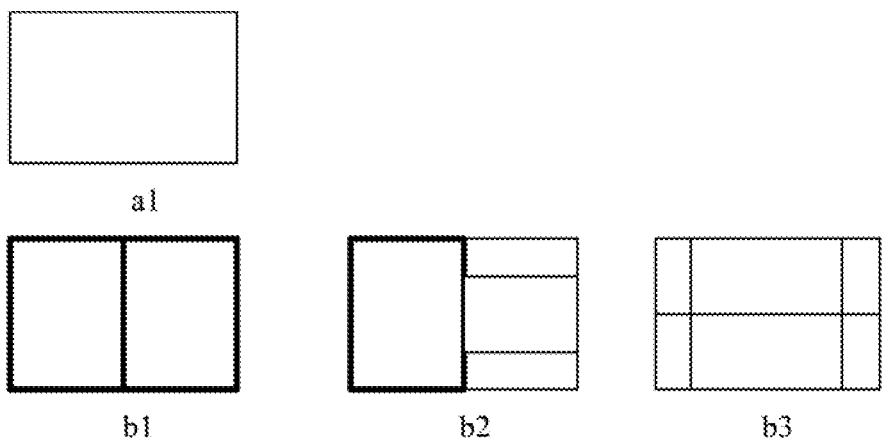
FIG. 3A and FIG. 3B illustrate a diagrammatic view of an embodiment of layouts for multiple sub-screens in a screen splitting system.
Figure 3B:
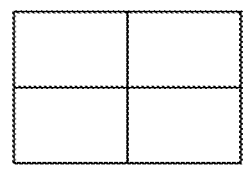
Figure 3B:
Figure 3B:
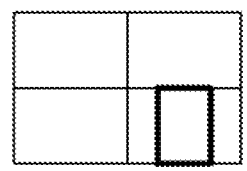
Figure 3B:
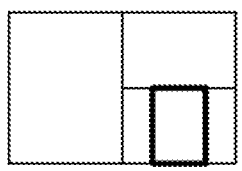
Figure 3B:
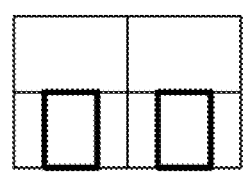
Figure 3B:
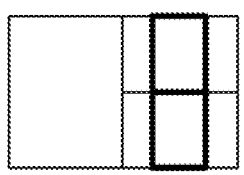
Figure 3B:
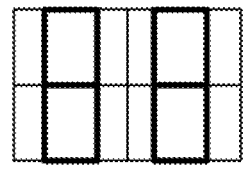
Figure 3B:
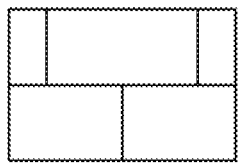

In the embodiment, the defined number is set to be 4. Referring to FIG. 3A and FIG. 3B, an embodiment of layouts for multiple sub-screens is illustrated. A rectangle with a thicker line as shown in FIG. 3A and FIG. 3B represents the display of applications with the vertical style.

Referring to FIG. 3A, the sub-screen is displayed to occupy full screen of television when the quantity of sub-screens which has already been associated with a remote control device is 1, displaying it as a1.

Referring to FIG. 3B, the sub-screens are displayed in primary layout as the single screen of a television is split into multiple sub-screens according to a defined number when the first number representing the quantity of sub-screens associated with the remote control device 2 is four, that is when the first number is equal to the defined number the layouts are displayed as d1, d2, d3, and d4.

Referring to FIG. 3A, the determining module 106 determines if a vertical style display of application is involved when the first number is 2, that is, between 1 and the defined number. The determining module 106 rearranges the first layout of the first sub-screens as a second layout if the vertical style for at least one application is involved, the single screen being split into two areas on the principle of firstly splitting the single screen into equal left and right areas. Then, the application with the vertical style is arranged to be located in either one of the two areas, and the other displaying application on the other one of the two areas when the vertical style displaying application is involved (referring to b1 and b2). The determining module 106 rearranges the first layout of the first sub-screens as a third layout when the vertical style for at least one application is not involved. The single screen is split into equal top and bottom areas, then either one of the top and bottom areas is split into equal left and right areas when the vertical style for at least one application is not involved. In this situation all applications are rearranged on corresponding split areas; the screen proportion of each application on the split areas is adjusted adaptively according to the size and resolution definition of the screen of each area while all applications are arranged to be located in corresponding areas, two applications on two split areas being arranged when the vertical style displaying application is not involved (referring to b3).

Referring further to FIG. 3B, the determining module 106 determines if a vertical style for at least one application is involved when the first number is 3 (that is, between 1 and the defined number); the single screen is split into two areas on the principle of firstly splitting the single screen into two equal areas, on left and right sides, then arranging vertical style display of application on either one of the two areas. Furthermore, the other area is split into two equal areas on top and bottom sides to arrange the other two applications when the vertical style displaying of application is involved (referring to c1, c2, and c3); the single screen is split into two areas on the principle of firstly splitting the single screen into two equal top and bottom areas, additionally splitting either one of the two areas into two equal left and right areas when the style of three applications is the horizontal style. This means that the vertical style of display is not involved and the three applications are arranged on three split areas (referring to c4).

Figure 4:
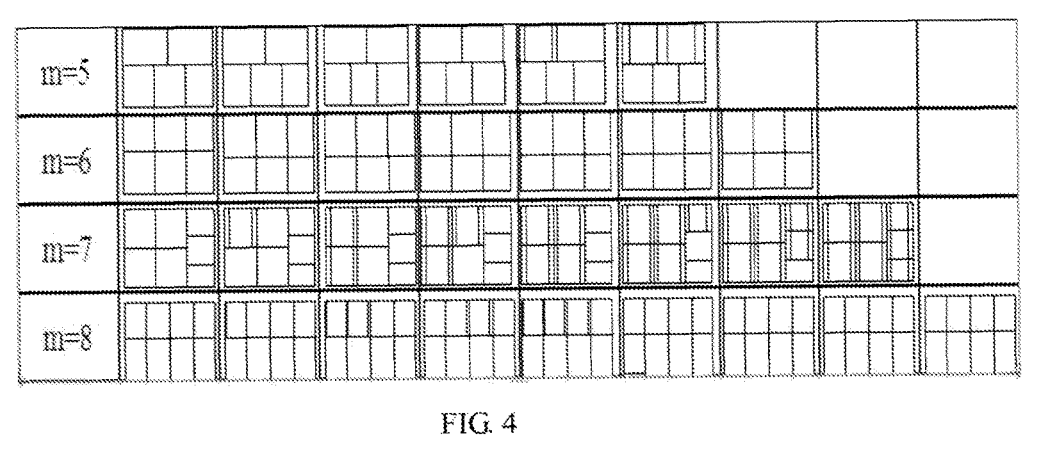

In the embodiment, the first number may be larger than 4 if defined by a user. A predetermined correspondence between the layout of sub-screens and the first number is adopted to create multiple sub-screens when the first number is larger than 4. The predetermined correspondence is built-in to the system or defined by the user. Referring to FIG. 4, the determining module 106 displays a layout of sub-screens according to the predetermined correspondence, arranges vertical style displaying of applications on areas in turn firstly, then arranges horizontal style displaying of applications on the other areas in turn. The letter "m" represents the first number which is also the quantity of sub-screens which have already been associated with the remote control device 2.

Figure 5:
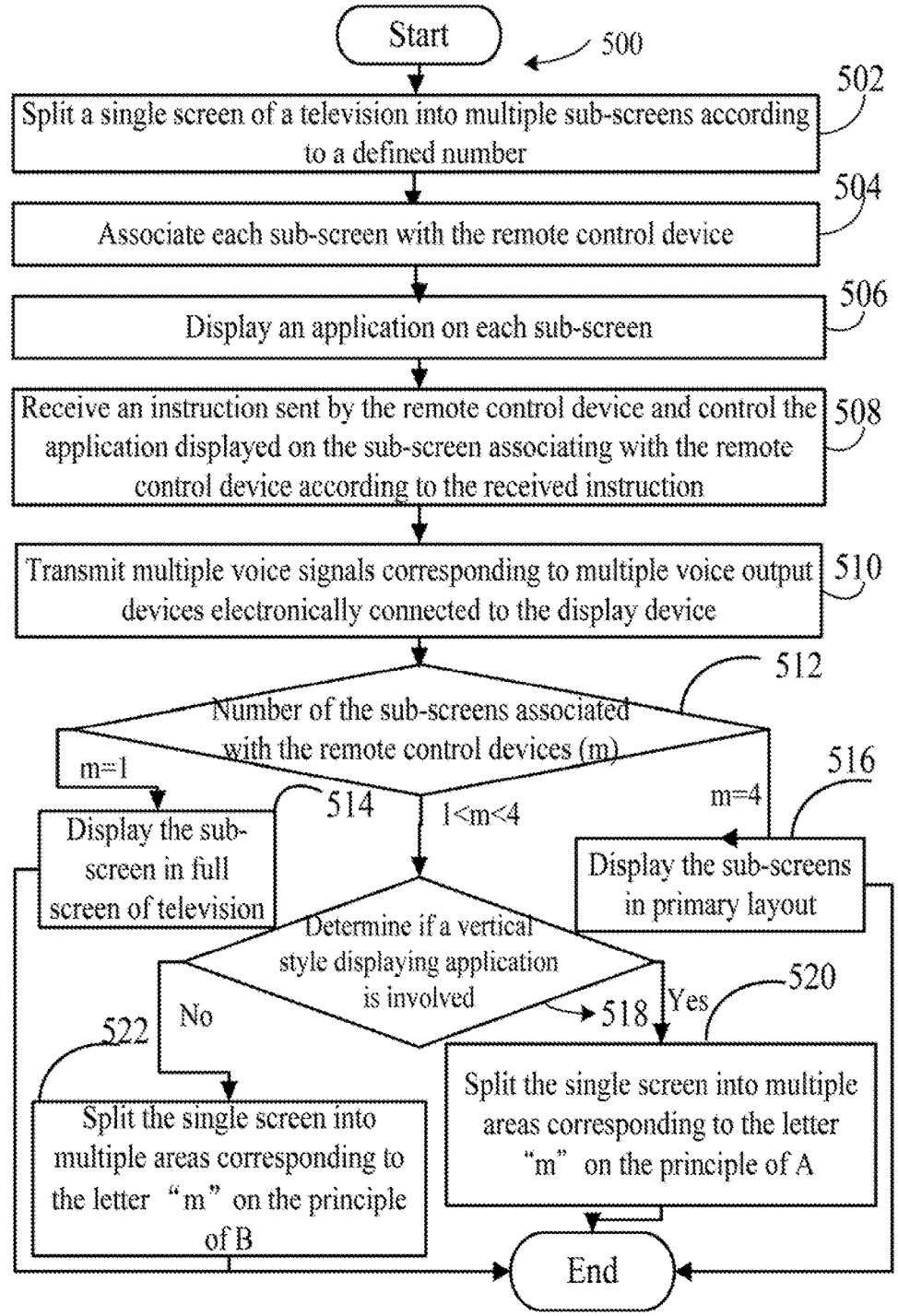
FIG. 5 illustrates a flowchart of an embodiment of a screen splitting method.

Referring to FIG. 5, a flowchart is presented in accordance with an example embodiment of a screen splitting method 500, and the function modules 101-106, as FIG. 2 illustrates, are executed by the processor 40 to split the screen. The method 500 is provided by way of example, as there are a variety of ways to carry out the method. The method 500 described below can be carried out using the configurations illustrated in FIG. 2, for example, and various elements of these figures are referenced in explaining the method 500. Each block shown in FIG. 2 represents one or more processes, methods, or subroutines, carried out in the exemplary method 500. Additionally, the illustrated order of blocks is by example only and the order of the blocks can change. The method 500 can begin at block 502.

At block 502, the screen splitting module 101 splits a single screen of a television into a number of multiple sub-screens, the number being defined by user, for example, 2 or 4 or other number, certainly the defined number is not absolute. Each sub-screen is defined with a serial number according to the user's preference. In the embodiment, each sub-screen is entirely configured with the same functions, the different serial numbers of the sub-screens are only to distinguish the sub-screens, and the sequence of the serial numbers has no effect with the function of each sub-screen.

At block 504, the associating module 102 associates each sub-screen with the remote control device 2. In the embodiment, a sub-screen may be associated with one or multiple remote control devices 2. Sometimes the sub-screen may be not associated with any remote control device 2.

At block 506, the displaying module 103 displays an application on respective desktops of each sub-screen. In the embodiment, the displaying module 103 displays the main interface of application on the sub-screen for users to select after the associating module 102 associates the sub-screen with the remote control device 2.

At block 508, the receiving module 104 receives instructions from the remote control devices 2. The receiving module 104 also controls the application displayed on the sub-screen associating with the remote control device according to the received instructions. In the embodiment, the displaying module 103 displays the main interface of applications on the sub-screen for users to select. The remote control device 2 will send the request instruction to the receiving module 104 when the users select the application of the sub-screen according to personal preference by operating the remote control device 2. The receiving module 104 receives the request instructions and controls the application displayed on the sub-screen associating with the remote control device 2 according to the received instruction.

At block 510, the outputting module 105 transmits voice signals corresponding to multiple voice output devices 3. In the embodiment, each sub-screen is corresponding to at least one voice output device 3. A voice signal will be generated with the sub-screen's working, then, the outputting module 105 transmits the voice signal to the corresponding voice output devices 3. So, multiple voice signals generated by applications of multiple sub-screens do not suffer interference with or from each other. In the embodiment, the voice output devices 3 can be a speaker, an earphone, a sound box and other voice output devices.

At block 512, the determining module 106 determines a first number which is the quantity of sub-screens which has already been associated with the remote control devices 2, and makes a first layout of first multiple sub-screens according to the first number of the first sub-screens and representative styles of the first displaying applications related to the first sub-screens, the representative styles of the displaying applications can comprise a horizontal style and a vertical style. In the embodiment, the television is split into 4 sub-screens defined by the user. The first number is represented by a letter "m".

At block 514, the determining module 106 displays the sub-screen in full screen of television while the letter "m" is 1.

At block 516, the determining module 106 displays the sub-screens in primary layout as the single screen of a television is split into multiple sub-screens according to the defined number while the letter "m" is 4.

At block 518, the determining module 106 determines if a vertical style displaying application is involved while the letter "m" is between 1 and 4 and makes a first layout of first sub-screens according to the first number "m" of the first sub-screens associated with the remote control device 2.

At block 520, the determining module 106 rearranges the first layout of the first sub-screens as a second layout corresponding to the letter "m" on the principle of A when the vertical style displaying application is involved; and rearranges all applications on corresponding split areas. A is that firstly splitting the single screen into equal left and right areas, and the application with the vertical style can be located in either areas. Further, the remaining area (without the application with the vertical style) is split into equal top and bottom areas.

At block 522, the determining module 106 rearranges the first layout of the first sub-screens as a third layout corresponding to the letter "m" on the principle of B when the vertical style displaying application is not involved; and rearranges all applications on corresponding split areas. B is that firstly splitting the single screen into equal top and bottom areas, then either one of the top and bottom areas can be split into equal left and right areas when the vertical style for at least one application is not involved.

Figure 6:
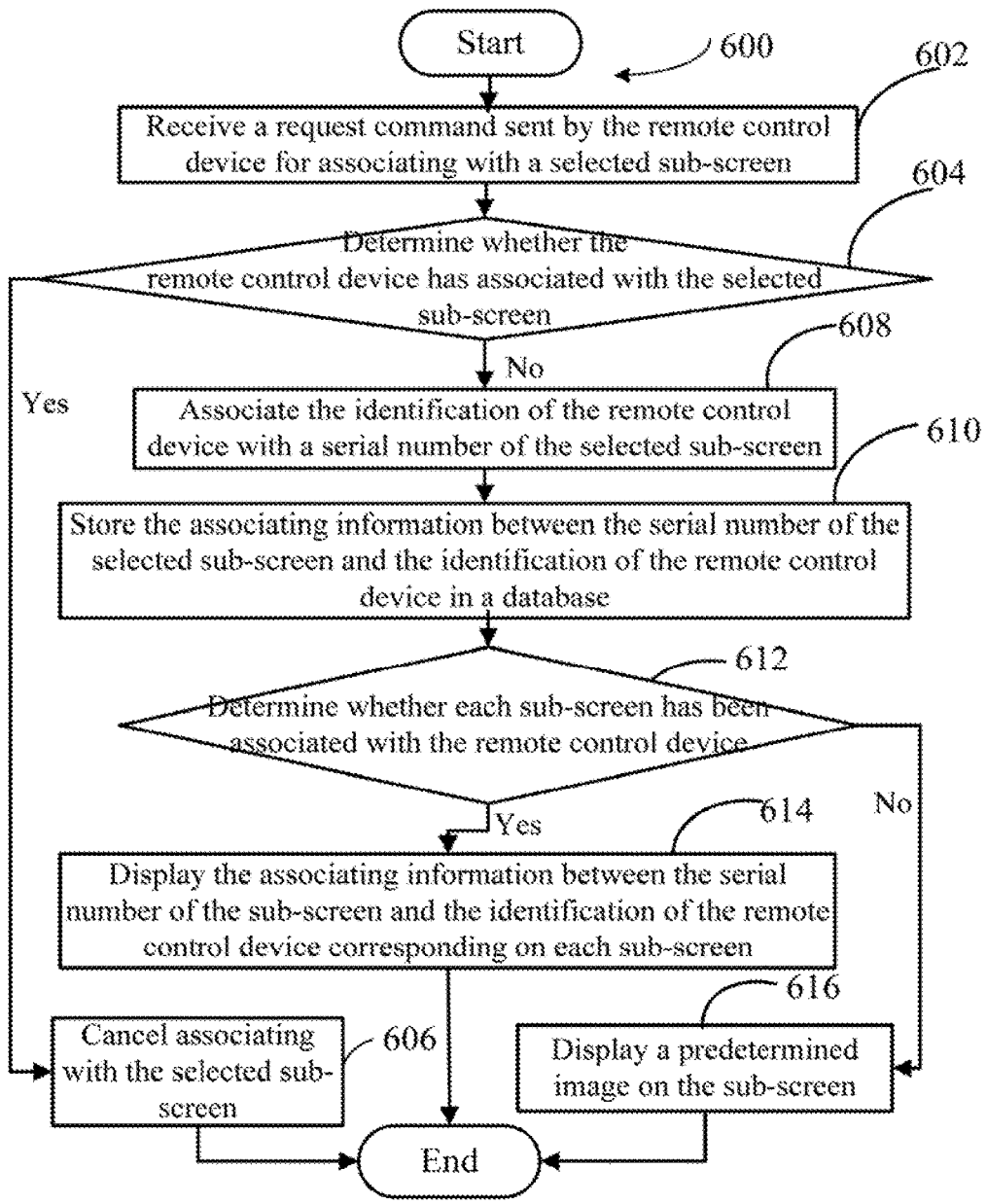
FIG. 6 illustrates a flowchart of an embodiment of a method for associating the sub-screens and a remote device after splitting of a screen.

Referring to FIG. 6, a flowchart is presented in accordance with an example embodiment of a method 600 to realize block 504 as illustrated in FIG. 5. Each block shown in FIG. 6 represents one or more processes, methods, or subroutines, carried out in the exemplary method 600. Additionally, the illustrated order of blocks is by example only and the order of the blocks can change. The method 600 can begin at block 602.

At block 602, the associating module 102 receives a request command from the remote control device 2 for associating with a selected sub-screen, wherein the request command contains an ID number of the remote control device.

At block 604, the associating module 102 determines whether the remote control device has associated with the selected sub-screen or not. In the embodiment, the associating module 102 determines whether each sub-screen has been associated with the remote control device 2 according to whether the associating information between the serial number of the sub-screen and the ID number of the remote control device 2 is stored in the database 20 or not. In the embodiment, the sub-screen has been associated with one or multiple remote control devices 2 while the serial number of the sub-screen is stored with one or more corresponding ID numbers of the remote control device 2 in database 20. The other way round, the sub-screen has not been associated with any remote control device 2 while the serial number of the sub-screen is not stored with any corresponding ID number of the remote control device 2 in database 20.

At block 606, the associating module 102 cancels associating with the selected sub-screen while the remote control device 2 has associated with the selected sub-screen.

At block 608, the associating module 102 matches the ID number of the remote control device 2 with a serial number of the selected sub-screen while the remote control device has not associated with the selected sub-screen.

At block 610, the associating module 102 stores the associating information between the serial number of the selected sub-screen and the ID number of the remote control device in a database 20.

At block 612, the associating module 102 determines whether each sub-screen has been associated with the remote control device 2 according to whether the associating information between the serial number of the sub-screen and the ID number of the remote control device is stored in the database or not.

At block 614, the associating module 102 displays the associating information between the serial number of the sub-screen and the ID number of the remote control device 2 corresponding on each sub-screen while the sub-screen has been associated with at least one remote control device 2.

At block 616, the associating module 102 displays a predetermined image on the sub-screen while some sub-screen has not been associated with any remote control device 2.

The embodiments shown and described above are only examples. Many details are often found in the art such as the other features of a device and method for splitting screen. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A screen splitting method comprising:
splitting a single screen of a television into multiple sub-screens according to a defined number;
associating the sub-screens with at least one remote control device, wherein one sub-screen relates to one application;
activating and displaying a plurality of applications relating to corresponding ones of the multiple sub-screens on the sub-screens;
receiving, from the remote control device, an instruction to select one of the plurality of applications; and
controlling the selected application displayed on a corresponding related sub-screen via the remote control device according to the received instruction;
making a first layout of first sub-screens according to a first number of the first sub-screens and representative styles of the first applications related to the first sub-screens,
wherein the representative styles comprises a horizontal style and a vertical style;
wherein the making of layout comprises:
determining whether the vertical style for at least one application is involved if the first number is between 1 and the defined number;
rearranging the first layout of the first sub-screens as a second layout if the vertical style for at least one application is involved; and
connecting the first applications to and displaying the first applications in the first sub-screens.

2. The method as claimed in claim 1, wherein the layout making step further comprises:

rearranging the first layout of the first sub-screens as a third layout if the vertical style for at least one application is not involved;
connecting the first applications to and displaying the first applications in the first sub-screens; and
adjusting adaptively screen proportions of the first applications in the first sub-screens according to the size and resolution definition of each of the first sub-screens.

3. The method as claimed in claim 1, wherein the layout making step further comprises:
displaying the only one sub-screen in full screen of television if the first number is 1;
arranging the first sub-screens as the first layout when the first number is equal to the defined number.

4. The method as claimed in claim 1, wherein the sub-screen associating step further comprises:
receiving a request command from the remote control device for associating with a selected sub-screen, wherein the request command contains an ID number of the remote control device; and
determining whether the remote control device has associated with the selected sub-screen.

5. The method as claimed in claim 4, wherein the sub-screen associating step further comprises:
canceling the associating with the selected sub-screen when the remote control device has associated with the selected sub-screen; and
matching the ID number of the remote control with a serial number of the selected sub-screen when the remote control device has not associated with the selected sub-screen.

6. The method as claimed in claim 4, wherein the sub-screen associating step further comprises:
storing the matching information and the ID number of the remote control device in a database;
determining whether a first sub-screen has been associated with the remote control device according to whether first matching information for the first sub-screen is found;
displaying the first matching information when the first sub-screen has been associated with the remote control device;
displaying a predetermined image on the first sub-screen when the first sub-screen is not associated with the remote control device.

7. A screen splitting system, comprising:
at least one processor;
a database;
a storage unit; and
one or more programs that are stored in the storage unit and executed by the at least one processor, the one or more programs comprising instructions for:
splitting a single screen of a television into multiple sub-screens according to a defined number;
associating the sub-screens with at least one remote control device, wherein one sub-screen relates to one application;
activating and displaying applications relating to the sub-screens on the sub-screens;
receiving an instruction, corresponding to a selected application, from the remote control device; and
controlling the selected application displayed on a related sub-screen via the remote control device according to the received instruction;
making a first layout of first sub-screens according to a first number of the first sub-screens and representative styles of the first applications related to the first sub-screens,
wherein the representative styles comprises a horizontal style and a vertical style;
wherein the making of layout comprises:
determining whether the vertical style for at least one application is involved if the first number is between 1 and the defined number;
rearranging the first layout of the first sub-screens as a second layout if the vertical style for at least one application is involve; and
connecting the first applications to and displaying the first applications in the first sub-screens.

8. The system as claimed in claim 7, wherein the layout making step further comprises:
rearranging the first layout of the first sub-screens as a third layout if the vertical style for at least one application is not involved;
connecting the first applications to and displaying the first applications in the first sub-screens; and
adjusting adaptively screen proportions of the first applications in the first sub-screens according to the size and resolution definition of each of the first sub-screens.

9. The system as claimed in claim 7, wherein the layout making step further comprises:
displaying the only one sub-screen in full screen of television if the first number is 1;
arranging the first sub-screens as the first layout when the first number is equal to the defined number.

10. The system as claimed in claim 7, wherein the sub-screen associating step further comprises:
receiving a request command from the remote control device for associating with a selected sub-screen, wherein the request command contains an ID number of the remote control device; and
determining whether the remote control device has associated with the selected sub-screen.

11. The system as claimed in claim 10, wherein the sub-screen associating step further comprises:
canceling the associating with the selected sub-screen when the remote control device has associated with the selected sub-screen; and
matching the ID number of the remote control with a serial number of the selected sub-screen when the remote control device has not associated with the selected sub-screen.

12. The system as claimed in claim 10, wherein the sub-screen associating step further comprises:
storing the matching information and the ID number of the remote control device in a database;
determining whether a first sub-screen has been associated with the remote control device according to whether first matching information for the first sub-screen is found;
displaying the first matching information when the first sub-screen has been associated with the remote control device;
displaying a predetermined image on the first sub-screen when the first sub-screen is not associated with the remote control device.

* * * * *